(12) United States Patent
Siklosi et al.

(10) Patent No.: US 7,931,335 B1
(45) Date of Patent: Apr. 26, 2011

(54) CAR SEAT PROTECTOR WITH CHASSIS LOCK SYSTEM

(75) Inventors: Tibor Siklosi, Joplin, MO (US); David Price, Miami, OK (US)

(73) Assignee: Bergan, LLC, Monkey Island, OK (US)

( * ) Notice: Subject to any disclaimer, the term of this patent is extended or adjusted under 35 U.S.C. 154(b) by 0 days.

(21) Appl. No.: 12/490,146

(22) Filed: Jun. 23, 2009

(51) Int. Cl.
  *A47C 31/00* (2006.01)
  *A47C 31/02* (2006.01)
  *A47C 31/11* (2006.01)

(52) U.S. Cl. .................. 297/229; 297/219.1; 297/228.1; 297/228.11; 297/228.12; 297/228.13; 297/481

(58) Field of Classification Search .................. 297/226, 297/228.1, 228.11, 228.12, 228.13, 229, 297/481, 219.1
See application file for complete search history.

(56) References Cited

U.S. PATENT DOCUMENTS

| | | | | |
|---|---|---|---|---|
| 1,492,651 | A * | 5/1924 | Rowley | 297/253 |
| 1,882,485 | A * | 10/1932 | Clements | 297/253 |
| 2,109,652 | A * | 3/1938 | Emmey et al. | 297/253 |
| 2,119,023 | A * | 5/1938 | Pickard | 297/253 |
| 2,663,359 | A * | 12/1953 | Wood | 297/253 |
| 2,833,341 | A * | 5/1958 | Bornstein | 297/229 |
| 2,987,115 | A * | 6/1961 | Morrill, Jr. | 297/219.1 X |
| 3,083,054 | A * | 3/1963 | Weaver | 297/228.12 |
| 3,934,933 | A * | 1/1976 | Long | 297/219.1 |
| 4,047,757 | A * | 9/1977 | Eames et al. | 297/230.12 |
| 4,383,712 | A * | 5/1983 | Kaganas | 297/228.12 |
| 4,396,227 | A * | 8/1983 | Neilson | 297/228.11 |
| 4,400,030 | A | 8/1983 | Maruzzo et al. | |
| 4,410,214 | A * | 10/1983 | Geschwender | 297/118 |
| 4,669,779 | A * | 6/1987 | Kaganas et al. | 297/229 |
| 4,693,511 | A | 9/1987 | Seltzer et al. | |
| 4,723,814 | A * | 2/1988 | Hunt | 297/219.1 |
| 4,813,740 | A * | 3/1989 | Yon et al. | 297/228.1 |
| D307,370 | S * | 4/1990 | Bailey et al. | D6/611 |
| 4,958,886 | A | 9/1990 | Barattini et al. | |

(Continued)

FOREIGN PATENT DOCUMENTS

GB 2257356 11/1991

(Continued)

*Primary Examiner* — Rodney B White
(74) *Attorney, Agent, or Firm* — Head, Johnson & Kachigian, P.C.

(57) ABSTRACT

A car seat protector for covering and protecting a car seat from becoming soiled, where the car seat has a sitting area and a back rest, where the back rest has sides and a top, and where the car seat is mounted to a chassis such that the back rest is attached to the chassis and a gap is formed between the chassis and the back rest along the sides and the top of the back rest; and where the car seat protector comprises: a seat portion, comprising fabric of sufficient size and shape to cover the sitting area of the car seat; a back portion, comprising fabric of sufficient size and shape to cover the back rest of the car seat, where the back portion has sides and a top; a back side portion, comprising fabric extending from the sides and top of the back portion, where the back side portion is of sufficient size and shape to cover the sides and top of the back rest and extend beyond the gap formed between the chassis and the back rest; and a plurality of retention parts encased within the back side portion, such that the retention parts may be inserted into the gap formed between the chassis and the back rest.

4 Claims, 5 Drawing Sheets

U.S. PATENT DOCUMENTS

| | | | |
|---|---|---|---|
| 4,969,683 A * | 11/1990 | Wallace et al. | 297/219.1 X |
| 5,028,472 A | 7/1991 | Gray | |
| 5,139,311 A * | 8/1992 | Imai et al. | 297/481 |
| 5,150,947 A * | 9/1992 | Croshaw | 297/229 |
| 5,234,252 A * | 8/1993 | Wallach | 297/229 |
| 5,265,933 A * | 11/1993 | Croshaw | 297/228.1 |
| 5,403,066 A | 4/1995 | Drum | |
| 5,547,249 A * | 8/1996 | Riley et al. | 297/228.13 |
| 5,549,353 A * | 8/1996 | Gaudet et al. | 297/219.1 X |
| 5,722,723 A * | 3/1998 | Riley et al. | 297/228.13 |
| 5,803,539 A | 9/1998 | Dewar et al. | |
| 5,803,542 A * | 9/1998 | Insausti | 297/230.12 X |
| 5,820,215 A * | 10/1998 | Dreisbach | 297/256.16 |
| 5,829,828 A * | 11/1998 | Asfaw | 297/219.1 |
| 5,884,967 A * | 3/1999 | Gasper | 297/216.11 |
| 6,048,026 A * | 4/2000 | Barnett et al. | 297/229 |
| 6,089,659 A * | 7/2000 | Toyota | 297/228.11 |
| 6,309,017 B1 | 10/2001 | Middleton | |
| 6,322,141 B1 * | 11/2001 | Dutkievic et al. | 297/219.1 X |
| 6,338,527 B1 * | 1/2002 | Toyota et al. | 297/229 |
| 6,345,866 B1 * | 2/2002 | Jackson et al. | 297/228.12 |
| 6,447,059 B1 * | 9/2002 | Jackson et al. | 297/228.12 |
| 6,652,026 B2 * | 11/2003 | Toyota et al. | 297/229 |
| 6,655,735 B1 | 12/2003 | Learning | |
| 6,676,209 B1 * | 1/2004 | Szabo et al. | 297/219.1 |
| 6,722,733 B2 * | 4/2004 | Schmidt et al. | 297/229 |
| 6,786,546 B2 * | 9/2004 | McConnell et al. | 297/219.12 |
| 6,817,664 B1 * | 11/2004 | Tang et al. | 297/229 |
| D500,623 S | 1/2005 | Jones | |
| 6,959,964 B1 * | 11/2005 | Zapf | 297/230.14 |
| 7,261,375 B2 * | 8/2007 | Godshaw et al. | 297/228.12 |
| 7,374,240 B2 * | 5/2008 | Gold et al. | 297/229 X |
| 7,422,278 B2 * | 9/2008 | McConnell et al. | 297/219.12 X |
| 7,427,103 B2 * | 9/2008 | Weber | 297/228.13 |
| 7,488,041 B2 * | 2/2009 | Pokrishevsky et al. | 297/230.1 X |
| 7,607,732 B2 * | 10/2009 | Beroth et al. | 297/228.12 |
| 7,681,292 B2 * | 3/2010 | McConnell et al. | 29/91.1 |
| 7,878,588 B2 * | 2/2011 | Snedeker | 297/229 |
| 2004/0189067 A1 * | 9/2004 | McConnell et al. | 297/219.1 |
| 2004/0212230 A1 | 10/2004 | Hanks | |
| 2007/0040426 A1 | 2/2007 | Kenny | |
| 2007/0210627 A1 * | 9/2007 | McConnell et al. | 297/219.1 X |
| 2007/0262624 A1 * | 11/2007 | Snedeker | 297/219.1 |
| 2008/0061610 A1 | 3/2008 | Tache | |
| 2008/0093900 A1 * | 4/2008 | Gold et al. | 297/219.12 |
| 2008/0122274 A1 * | 5/2008 | Edwards | 297/228.12 |
| 2008/0179926 A1 * | 7/2008 | Kushner | 297/229 |
| 2010/0187869 A1 * | 7/2010 | McConnell et al. | 297/219.1 X |

FOREIGN PATENT DOCUMENTS

| | | |
|---|---|---|
| JP | 02005287558 | 10/2005 |
| JP | 2006288497 | 10/2006 |
| JP | 3138727 | 10/2007 |

* cited by examiner

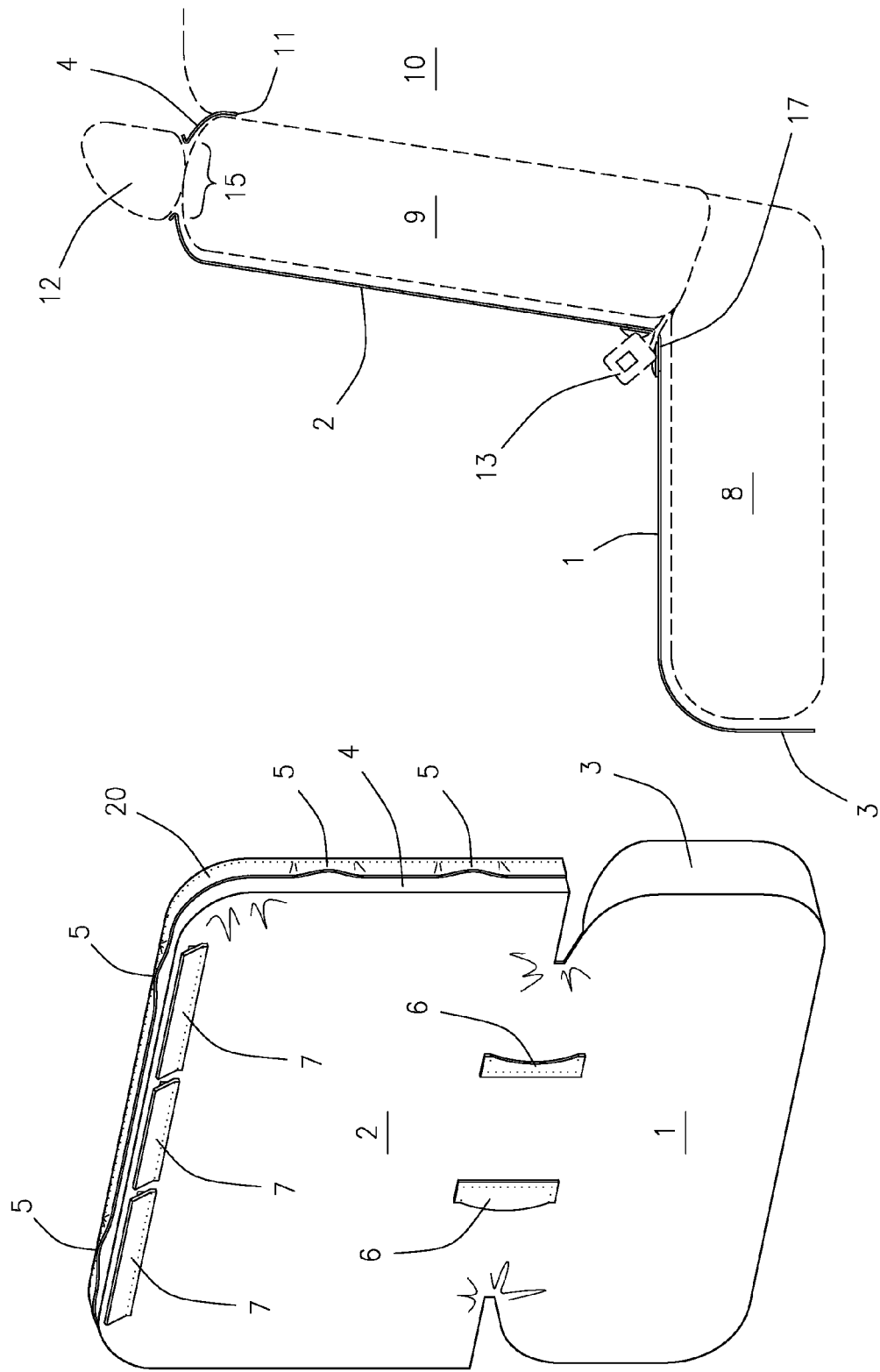

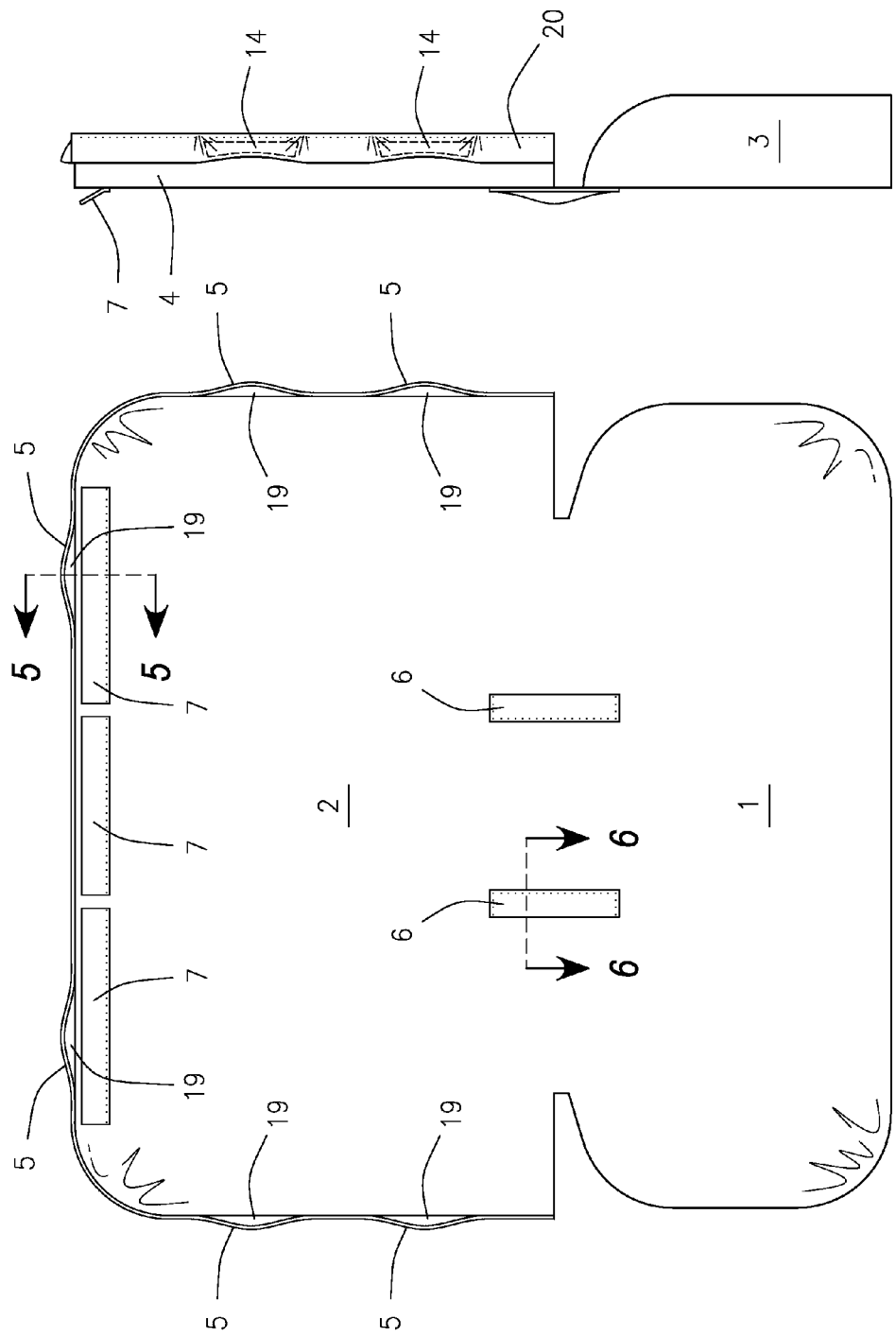

CAR SEAT PROTECTOR WITH CHASSIS LOCK SYSTEM

CROSS REFERENCE

Not Applicable.

BACKGROUND OF THE INVENTION

1. Field of the Invention

This invention relates generally to a car seat protector, and more particularly, but not by way of limitation, to a car seat protector with a chassis lock system.

2. Description of the Related Art

Seat protectors are often used to keep the seats of a car clean when transporting potentially messy cargo, including pets and dirty or wet passengers. However, traditional car seat protectors offer certain drawbacks. One drawback stems from the fact that different makes and models of cars have different seat sizes and shapes and may have seatbelts and headrests in different locations. Therefore, many car seat protectors may be used on only a limited number of car models for which the seat protectors are designed.

One of the biggest drawbacks concerns the difficulty of securing a traditional seat protector to a back seat in a car with a trunk. Car seat protector may be easily secured to seats with backs, such as bucket or bench seats in the fronts of cars, in SUVs, and in vehicles with hatchbacks, as the seat protector may have straps that extend around the back of the seat to keep the seat protector in place. However, back seats in cars with trunks do not have backs around which straps may be placed. Therefore, installing and securing a seat protector on such a seat is difficult. Some seat protectors are intended to cover only the front of the seat without being secured. As a result, these seat protectors are easily displaced, exposing the seat below to the conditions from which the seat protector was intended to protect.

While securing a seat protector is crucial to its proper function, easy removal of the seat protector is likewise important. Therefore, drastic measures to secure the seat protector to the seat are undesirable.

Accordingly, it is desirable to provide a car seat protector that may be used on a variety of makes and models of cars and that may be secured to a back seat of a car with a trunk such that it is not easily dislodged, but may be easily removed when needed.

SUMMARY OF THE INVENTION

In general, in a first aspect, the present invention relates to a car seat protector for covering and protecting a car seat from becoming soiled, where the car seat has a sitting area and a back rest, where the back rest has sides and a top, and where the car seat is mounted to a chassis such that the back rest is attached to the chassis and a gap is formed between the chassis and the back rest along the sides and the top of the back rest; and where the car seat protector comprises: a seat portion, comprising fabric of sufficient size and shape to cover the sitting area of the car seat; a back portion, comprising fabric of sufficient size and shape to cover the back rest of the car seat, where the back portion has sides and a top; a back side portion, comprising fabric extending from the sides and top of the back portion, where the back side portion is of sufficient size and shape to cover the sides and top of the back rest and extend beyond the gap formed between the chassis and the back rest; and a plurality of retention parts encased within the back side portion, such that the retention parts may be inserted into the gap formed between the chassis and the back rest. The fabric of the car seat protector may be water-resistant fabric, and the retention parts may be generally rectangular strips of hard plastic. The car seat protector may further comprise a seat side portion, comprising fabric extending from the sides of the seat portion, where the sitting area of the car has sides and the seat side portion is of sufficient size and shape to cover the sides of the sitting area of the car.

The retention parts may be enclosed within a hem in the back side portion. The back side portion may comprise a plurality of areas containing retention parts and a plurality of areas not containing retention parts, the back side portion may have an inner edge adjacent the back portion and an outer edge opposite the inner edge, and the hem may: have an exterior side adjacent the outer edge of the back side portion and an interior side opposite the exterior side, be attached to the back side portion on both sides in the areas not containing retention parts; and be attached to the back side portion only on the exterior side in the areas containing retention parts, thus forming pockets between the hem and the back side portion in the areas containing retention parts.

The car seat protector may further comprise one or more seat belt openings, where the seat belt openings are located in an area where the seat portion and the back portion connect such that seat belt parts connected to the car seat may extend through the seat belt openings when the car seat protector is in place on the car seat. The car seat protector may further comprise one or more flaps, where each flap is attached to one side of one of the seat belt openings and extends over the seat belt opening and a portion of the car seat protector on an opposite side of the seat belt opening. The flap and the opposite side of the seat belt opening may be removably attached to each other via a hook and loop fastener.

Similarly, the car seat protector may further comprise one or more head rest openings, where the head rest openings are located in the top of the back portion such that a head rest attached to the car seat may extend through the head rest openings when the car seat protector is in place on the car seat. The car seat protector may further comprise one or more flaps, where each flap is attached to one side of one of the head rest openings and extends over the head rest opening and a portion of the car seat protector on an opposite side of the head rest opening. The flap and the opposite side of the head rest opening may be removably attached to each other via a hook and loop fastener.

BRIEF DESCRIPTION OF THE DRAWINGS

FIG. 1 is a perspective view of a car seat protector with a chassis lock system;

FIG. 2 is a side view of a car seat protector with a chassis lock system as used on a car back seat mounted to a chassis;

FIG. 3 is a front view of a car seat protector with a chassis lock system;

FIG. 4 is a side view of a car seat protector with a chassis lock system;

DETAILED DESCRIPTION OF THE INVENTION

Figure 5:
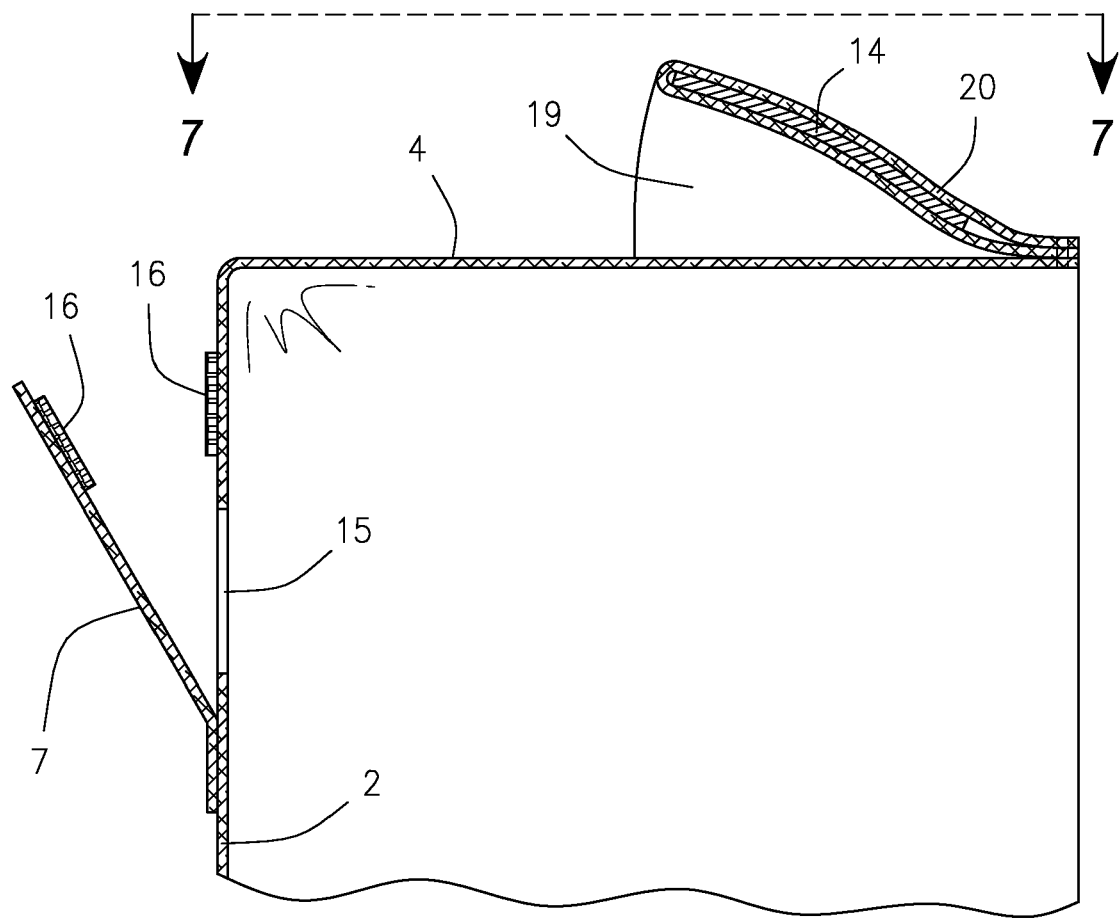
FIG. 5 is a cross section view of a portion of a car seat protector with a chassis lock system, featuring a head rest opening and flap and a retention part and pocket.
Figure 6:
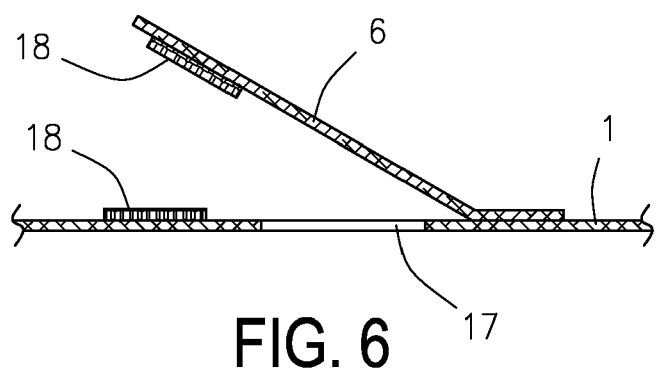
FIG. 6 is a cross section view of a portion of a car seat protector with a chassis lock system, featuring a seat belt opening and flap.
Figure 7:
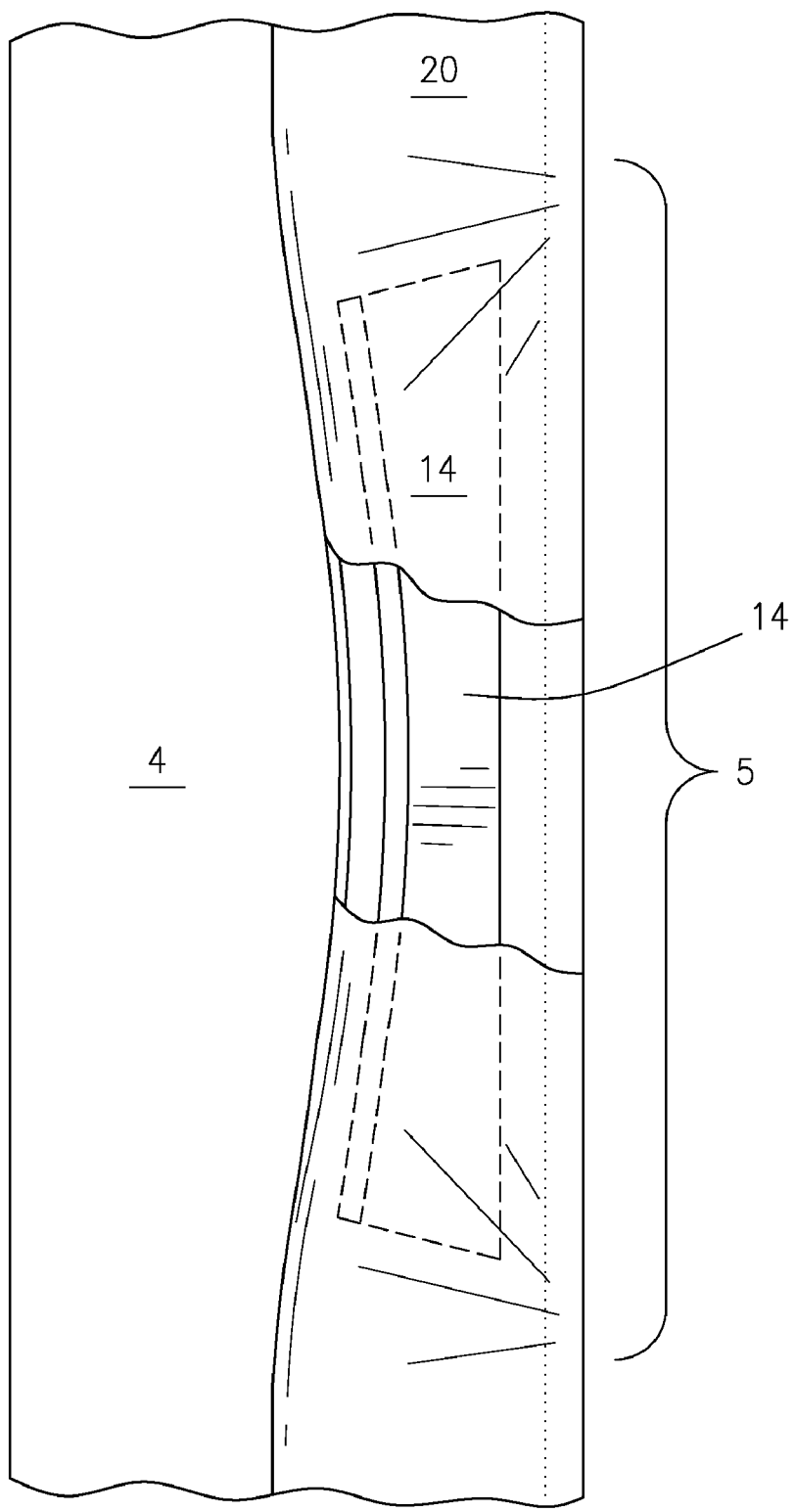
FIG. 7 is a top view of a portion of a car seat protector with a chassis lock system, featuring a cut-out view of a retention part.
Figure 8:
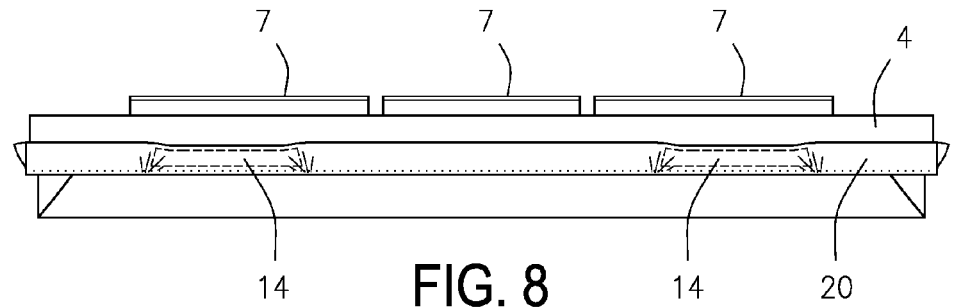
FIG. 8 is a top view of a car seat protector with a chassis lock system.
Figure 9:
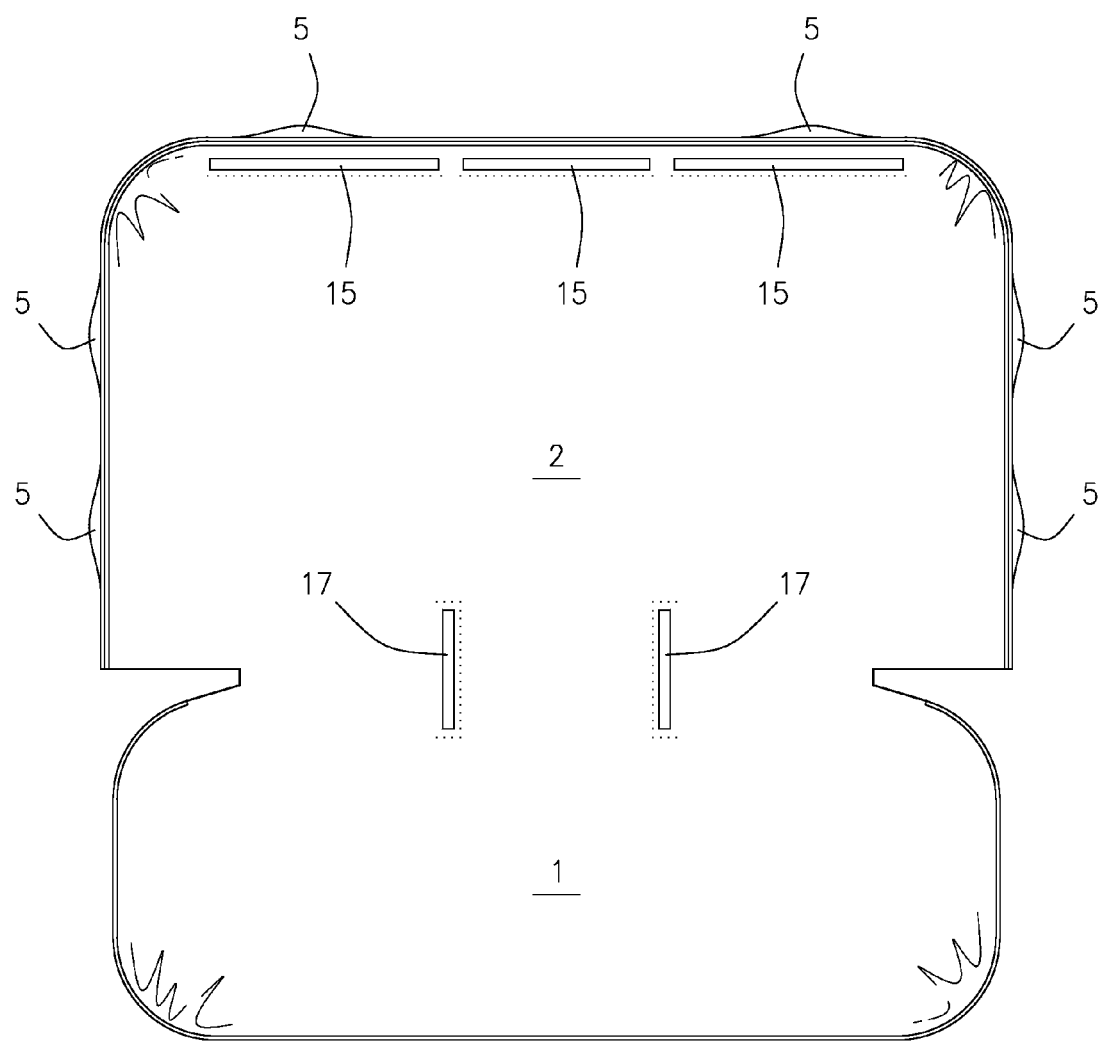
FIG. 9 is a back view of a car seat protector with a chassis lock system.

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the present invention relates to a car seat protector with a chassis lock system. The car seat protector may be made of water-resistant fabric, and such fabric may be heavy duty for durability and increased protection to the seats. As seen in FIGS. 1 through 4, the car seat protector has a seat portion 1 that covers the sitting area 8 of a car back seat, a back portion 2 that covers the back rest 9 of the car back seat, seat sides 3 that extend from the seat portion 1 to cover the sides of the sitting area 8 of the car back seat, and back sides 4 that extend from the back portion 2 to cover the top and sides of the back rest 9 of the car back seat.

As seen in FIGS. 1 through 5 and 7 through 9, retention parts 14 are enclosed at various locations 5 within the back sides 4. The retention parts 14 are shown in dashed lines in FIGS. 4 and 8 and parts of FIG. 7 because the retention parts 14 are encased within back sides 4. The retention parts 14 may be hard strips of plastic or other appropriate material, and allow the back sides 4 to be wedged into the gap 11 between the back rest 9 and the chassis 10 to which the back rest 9 is attached. When sufficiently wedged into the gap 11, the retention parts 14 help to keep the car seat protector in place so that it cannot be easily dislodged by accident. Because the retention parts 14 fit between the back rest 9 and the chassis 10, they do not interfere with the door closing and they prevent loose material from getting caught in the door. The retention parts 14 may be removed from the gap 11 by pulling, making for easy removal of the car seat protector when desired.

The retention parts 14 may be totally enclosed within a hem 20 in the edge of the back sides 4. The hem 20 may be fully attached on both sides in the areas of the back sides 4 in which there is no retention part 14, but may be attached only on the outside edge in the areas 5 of the back sides 4 in which there are retention parts 14. Thus, each of the enclosed retention parts 14 and the adjacent portion of the back side 4 form a pocket 19. A user may place his or her hand within the pocket 19 when installing the car seat protector in a car back seat to aid in the insertion of the back sides 4 into the gap 11. The pocket 19 also allows a user to grasp the enclosed retention part 14 when pulling the retention part 14 out of the gap 11 for removal of the car seat protector from the car back seat.

As seen in FIGS. 3 and 5, the car seat protector may have seat belt openings 17, which are openings in the area between the seat portion 1 and the back portion 2 located such that seat belt parts 13 may be pulled through the seat belt openings 17 when the car seat protector is in place on the car back seat. Each seat belt opening 17 may have a flap 6 attached to one side thereof and extending thereover and over a portion of car seat cover on the opposite side of the seat belt opening 17, where the flap 6 and the portion of the car seat cover over which the flap 6 extends may be removably attached to each other via a hook and loop fastener 18. Thus, the seat belt opening 17 may be easily opened for use or may be closed when not in use, reducing the possibility that debris will travel therethrough and soil the underlying car seat, and the seat belt opening 17 may accommodate a variety of seat belt placements due to varying car models.

Similarly, the car seat protector may have head rest openings 15, which are openings at the top of the back portion 2 located such that head rests 12 may extend through the head rest openings 15 when the car seat protector is in place on the car back seat. As with the seat belt openings 17, each of the head rest openings 15 may have a flap 7 attached to one side of thereof and extending thereover and over a portion of the car seat cover on the opposite side of the head rest opening 15. The flap 7 and the portion of the car seat cover over which the flap 7 extends may be removably attached to each other via a hook and loop fastener 16, allowing the head rest opening 15 to be easily opened for use or closed when not in use. Thus, the head rest openings 15 may accommodate car models with a variety of head rest configurations, including no head rests.

Whereas, the devices and methods have been described in relation to the drawings and claims, it should be understood that other and further modifications, apart from those shown or suggested herein, may be made within the spirit and scope of this invention.

What is claimed is:

1. A car seat protector for covering and protecting a car seat from becoming soiled, where the car seat has a sitting area and a back rest where the back rest has sides and a top, and where the car seat is mounted to a chassis such that the back rest is attached to the chassis and a gap is formed between the chassis and the back rest along the sides and the top of the back rest; and where the car seat protector comprises:
   a seat portion, comprising fabric of sufficient size and shape to cover the sitting area of the car seat;
   a back portion, comprising fabric of sufficient size and shape to cover the back rest of the car seat, where the back portion has sides and a top;
   a back side portion, comprising fabric extending from the sides and top of the back portion, where the back side portion is of sufficient size and shape to cover the sides and top of the back rest and extend beyond the gap formed between the chassis and the back rest;
   a plurality of retention parts encased within the back side portion, such that the retention parts may be inserted into the gap formed between the chassis and the back rest where the retention parts are hard plastic;
   one or more seat belt openings, where the seat belt openings are located in an area where the seat portion and the back portion connect such that seat belt parts connected to the car seat may extend through the seat belt openings when the car seat protector is in place on the car seat; and
   one or more flaps, where each flap is attached to one side of one of the seat belt openings and extends over the seat belt opening and a portion of the car seat protector on an opposite side of the seat belt opening.

2. The car seat protector of claim 1 where the flap and the opposite side of the seat belt opening are removably attached to each other via a hook and loop fastener.

3. A car seat protector for covering and protecting a car seat from becoming soiled, where the car seat has a sitting area and a back rest, where the back rest has sides and a top, and where the car seat is mounted to a chassis such that the back rest is attached to the chassis and a gap is formed between the chassis and the back rest along the sides and the top of the back rest; and where the car seat protector comprises:

a seat portion, comprising fabric of sufficient size and shape to cover the sitting area of the car seat;

a back portion, comprising fabric of sufficient size and shape to cover the back rest of the car seat, where the back portion has sides and a top;

a back side portion, comprising fabric extending from the sides and top of the back portion, where the back side portion is of sufficient size and shape to cover the sides and top of the back rest and extend beyond the gap formed between the chassis and the back rest;

a plurality of retention parts encased within the back side portion, such that the retention parts may be inserted into the gap formed between the chassis and the back rest where the retention parts are hard plastic;

one or more head rest openings, where the head rest openings are located in the top of the back portion such that a head rest attached to the car seat may extend through the head rest openings when the car seat protector is in place on the car seat; and one or more flaps, where each flap is attached to one side of one of the head rest openings and extends over the head rest opening and a portion of the car seat protector on an opposite side of the head rest opening.

4. The car seat protector of claim 3 where the flap and the opposite side of the head rest opening are removably attached to each other via a hook and loop fastener.

\* \* \* \* \*